Figure 1:
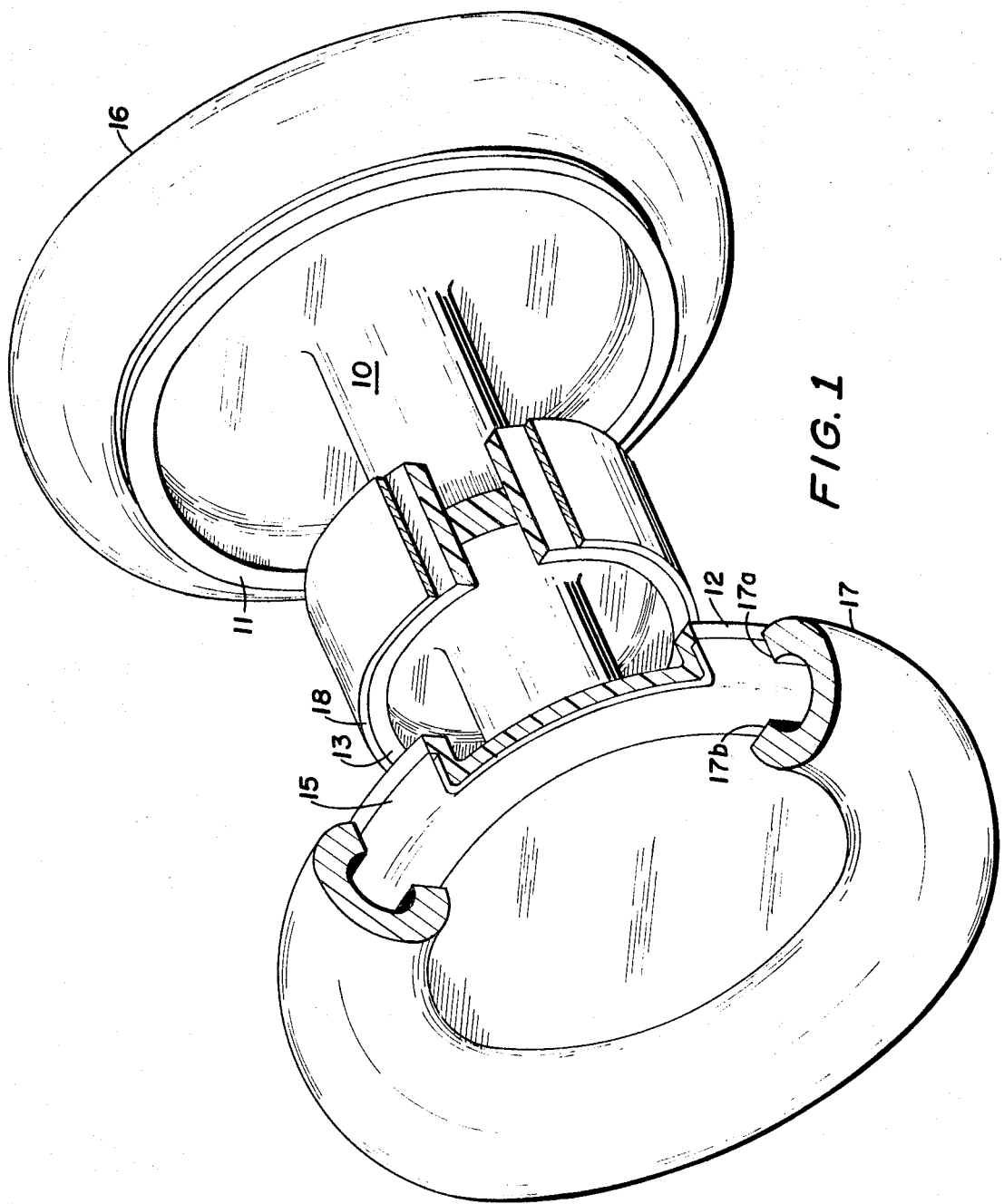

United States Patent

[11] 3,611,815

| [72] | Inventor | Robert E. Fischell<br>Silver Spring, Md. |
|---|---|---|
| [21] | Appl. No. | 887,954 |
| [22] | Filed | Dec. 24, 1969 |
| [45] | Patented | Oct. 12, 1971 |
| [73] | Assignee | The United States of America as represented by the Secretary of the Navy |

[54] FRICTIONLESS GYROSCOPE
7 Claims, 2 Drawing Figs.

[52] U.S. Cl. .................................................... 74/5.7, 308/10
[51] Int. Cl. ................................................. G01c 19/24
[50] Field of Search .......................................... 74/5., 5.7, 5.46; 308/10

[56] References Cited
UNITED STATES PATENTS

| 1,864,801 | 6/1932 | Chaplin | 74/5.7 X |
| 2,704,231 | 3/1955 | Goldsmith | 308/10 |
| 3,044,309 | 7/1962 | Buchhold | 74/5.7 X |
| 3,221,389 | 12/1965 | Cowell | 308/10 X |
| 3,428,370 | 2/1969 | Steingroever | 308/10 |
| 3,447,842 | 6/1969 | Steingroever | 308/10 |

Primary Examiner—Manuel A. Antonakas
Attorneys—Richard S. Sciascia and J. A. Cooke ABSTRACT: A substantially friction free gyroscope structure comprises a cylindrical rotor member whose ends are encompassed by a pair of annular permanent magnets. Each end of the rotor member carries a diamagnetic insert which coacts with the associated permanent magnet to establish repulsive magnetic forces which keep the rotor out of physical contact with the permanent magnet; i.e., the rotor is made to float with substantially zero friction. The possibility of eddy current losses is minimized both internal and external of the gyroscope by constructing the rotor of an electrically nonconductive material such as Fiberglas, for example, and by reason of the magnetic symmetry of the permanent magnets.

INVENTOR
ROBERT E. FISCHELL

INVENTOR
ROBERT E. FISCHELL

FRICTIONLESS GYROSCOPE

BACKGROUND OF THE INVENTION

As is well known, the gyroscope has found many practical uses, particularly in the aviation and space industry, and many attempts have been made heretofore to construct a gyroscope which is substantially friction free, so as to reduce the operating power need and to prolong the operating life of the device. For example, gyroscopes comprising a motor member which is supported by an airstream have been proposed, but obviously requires some source of pressurized air to form the air bearing. On the other hand, it has been previously proposed to form a magnetic bearing for a gyroscope rotor by surrounding each end of the rotor with a plurality of permanent magnets which exert attractive forces on the rotor and, assuming that the permanent magnets are properly spaced and sized, will cause the rotor to float therebetween. However, because such a magnetic suspension system operates on the principle of attractive forces created between the rotor and each of the permanent magnets, the system continually is biased towards an unstable condition, with the rotor attracted towards one or more of the permanent magnets.

DESCRIPTION OF THE PRESENT INVENTION

The structure proposed in accordance with the present invention overcomes the above-mentioned deficiencies of the prior art and is particularly adapted for use as a gyroscope on orbiting satellites to provide stabilization. More specifically, the proposed structure requires essentially no power to operate; it has extraordinarily long operating life; and, it can be operated at very high rotational rates, so that the required angular momentum necessary for satellite stabilization is achieved with low weight penalty.

The proposed device basically comprises a lightweight rotor member whose ends are surrounded by a pair of annular permanent magnets. Affixed to each end of the rotor member is an insert which is made of suitable diamagnetic material such as pyrolytic graphite or bismuth, and which is disposed so as to be repelled by the permanent magnet. As a result, a substantially friction-free rotor bearing is formed with the rotor member out of contact with the permanent magnets. Moreover, the rotor member is constructed of electrically nonconductive material, such as Fiberglas, so as to minimize the creation of eddy current within the rotor structure; whereas, external eddy current losses are reduced by reason of the symmetrical configuration of the permanent magnets.

Inasmuch as the proposed device of the present invention is intended for operation in the hard vacuum of space, there will be essentially no air molecules to retard rotation of the rotor member. Consequently, the stator winding ideally need only be energized until the device attains synchronous speed, at which time the stator can be deenergized. If necessary, the stator can be periodically pulsed in order to compensate for any long term changes in rotor speed.

As will be described in more detail hereinafter, it is also contemplated that the proposed structure of the present invention may be modified, if desired, by the addition of a roller bearing structure at each end of the rotor member. During operation as a gyroscope, for example, these roller bearings would only be called into play to take up the shock of any large angular accelerations of the satellite on which the gyroscope unit is mounted for stabilization purposes.

Although the proposed structure of the present invention has been described heretofore as being adapted for use as a satellite-borne gyroscope, it should be understood at this time that the present invention relates generally to rotary devices. Accordingly, one object of the present invention is to provide an essentially frictionless rotary device suitable for diverse spacecraft applications such as a rotating scan for an infrared horizon sensor, or for creating an angular momentum for satellite spin stabilization, or as a reaction wheel for one, two or three axis attitude control.

Another object of the present invention is to provide an improved gyroscope structure or the like wherein a substantially friction-free bearing is provided for the rotor member.

Another object of the present invention is to provide a gyroscope structure of the like wherein the repulsive forces created between a permanent magnet and a diamagnetic material are used to form a substantially friction-free rotor bearing.

A further object of the present invention is to provide a substantially friction-free gyroscope structure particularly adapted for use in stabilizing satellites.

A further object of the present invention is to provide a gyroscope structure or the like wherein the creation of internal and external eddy currents is minimized.

Figure 2:
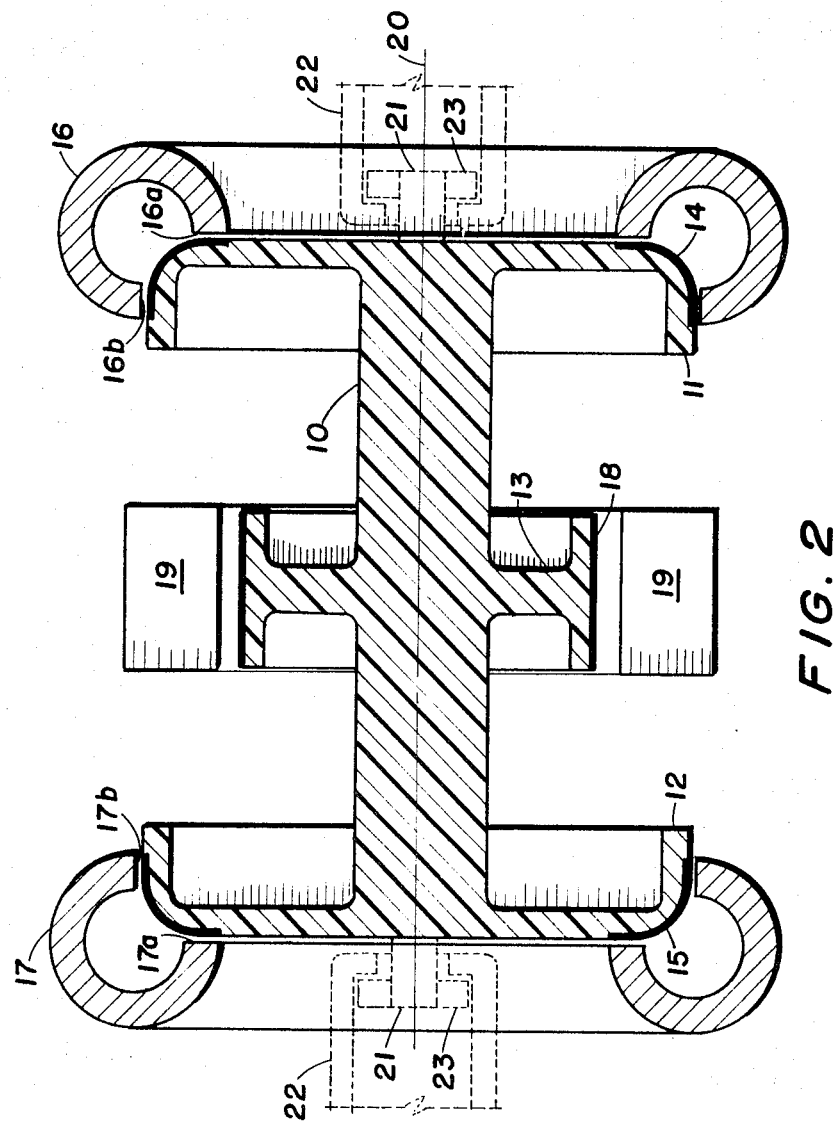

Other objects, purposes and characteristic features of the present invention will in part be pointed out as the description of the present invention progresses and in part be obvious from the accompanying drawings, wherein:

FIG. 1 is an isometric view, partly in section, of a gyroscope embodiment of the structure proposed in accordance with the present invention; and FIG. 2 is a sectional view of the gyroscope structure of FIG. 1 and showing, in dotted form, a modification thereof.

Referring now to the drawings, the present invention is illustrated in the form of a gyroscope structure comprising a generally cylindrical rotor member 10 constructed of a lightweight, electrically nonconductive material such as Fiberglas, for example. The rotor member 10 is formed with enlarged, cup-shaped portions 11 and 12 at either end and with a substantially T-shaped rib portion 13 at its longitudinal center. The enlarged end portions 11 and 12 of the rotor 10 are each formed with a notch extending around the outermost end surface and the adjacent peripheral surface thereof to receive annular inserts 14 and 15 respectively, constructed of suitable diamagnetic material such as pyrolytic graphite or bismuth.

A pair of stationary permanent magnets 16 and 17, each having a generally annular configuration, are disposed adjacent the enlarged portions 11 and 12 respectively of rotor 10 and are formed with a notched or cutaway portion to define pole faces 16a and 16b on magnet 16 and pole faces 17a and 17b on magnet 17. As best illustrated in FIG. 2 of the drawings, the pole faces 16a and 16b are separated by small airgaps which extend symmetrically about the right-hand end and the adjacent peripheral surface respectively of the enlarged end portion 11 of rotor 10, adjacent the diamagnetic insert 14; whereas, the pole faces 17a and 17b of permanent magnet 17 are similarly disposed symmetrically relative to the diamagnetic insert 15 on the enlarged end portion 12 of rotor 10. More specifically, the airgap between pole face 16a and insert 14 and the airgap between pole face 17a and insert 15 are longitudinal and extend in circles about the associated ends of the rotor 10; whereas, the airgaps between pole faces 16b and 17b and inserts 14 and 15 are lateral and encircle the peripheral surface of the rotor 10 adjacent its right and left-hand ends respectively.

The T-shaped central rib portion 13 of the rotor 10 carries an electrical conductor member 18 on the outermost flattened surface thereof, as shown in the drawings. For example, the conductor member 18 may be formed from a sheet of aluminum or other electrically conductive material bonded to the rib 13. A stator winding, diagrammatically represented in FIG. 2 at reference numeral 19, surrounds the central rib portion 13 and is spaced slightly from the conductor 18. This stator winding 19 is adapted to be energized from a suitable source of electric current (not shown) for the well-known purpose of creating a magnetic field which, in turn, produces forces at the rotor conductor 18 effective to rotate the rotor member 10 about its illustrated spin axis 20. It should be noted that the overall design configuration of the rotor member 10; i.e., with enlarged end portions 11 and 12 and rib portion 13, helps to assure that the rotor member is relatively lightweight and thereby reduce the energy required to start it in motion.

It is well known that certain materials, such as pyrolytic graphite and bismuth, are diamagnetic in nature; i.e., they are repelled by a permanent magnet. The diamagnetic insert 14 and 15 carried on the enlarged end portions 11 and 12 of the rotor member 10 thus function to maintain the ends of the rotor 10 free from the permanent magnets 16 and 17. In other words, the permanent magnetic field established between the pole faces 16a and 16b and between the pole faces 17a and 17b create repulsive forces at the diamagnetic inserts 14 and 15 respectively tending to constantly maintain the enlarged end portions 11 and 12 of the rotor spaced from and out of contact with the permanent magnets. Thus, the rotor 10 floats between the permanent magnets 16 and 17 on a substantially friction-free bearing, and consequently, the rotor 10 can be easily rotated by the magnetic field created by the stator winding 19; the proposed gyroscope requires very little, if any, energy to maintain it at synchronous speed; and, the proposed device will have an exceedingly long operating life. Moreover, because of the substantially friction-free bearing created by the interaction of the diamagnetic inserts 14 and 15 with the permanent magnets 16 and 17, the illustrated gyroscope structure can be operated at very high rotational rates, without requiring a large amount of power and without significant heating, so that substantial satellite stabilizing forces can be generated with reduced gyroscope weight requirements. Obviously, such weight reductions are very desirable in the field of satellite stabilization.

In FIG. 2 of the drawings, a modification of the basis gyroscope structure previously described is illustrated, wherein the ends of the rotor member 10 are provided with suitable roller bearing arrangements which functions to absorb the shock of any large angular accelerations experienced by the satellite. More specifically, each end of the rotor member 10 has a short shaft portion 21 extending therefrom along the longitudinal or spin axis 20 thereof. A stationary bearing housing structure 22 receives the extending end of the shaft member 21 and suitable roller bearings 23 (shown as being carried on shaft 21) are interposed between the extending end of the shaft member 21 and associated stationary bearing housing 22.

Obviously, various other modifications, adaptations and alterations are possible in light of the above teachings. It should therefore be understood that within the spirit and scope of the appended claims, the invention may be practiced otherwise than as specifically described.

What is claimed is:

1. A rotary device comprising,
   a cylindrical rotor member formed of electrically nonconductive material,
   said rotor member being formed with a longitudinally centered rib portion extending around said rotor member,
   a pair of annular-shaped permanent magnets, one of which is disposed adjacent each end of said rotor member,
   each of said permanent magnets being configured with a notched portion defining a pair of pole faces symmetrically spaced by a pair of airgaps from the end and adjacent peripheral surfaces respectively of said rotor member,
   one of said airgaps being longitudinal and extending in a circle about the associated end of said rotor member and the other of said airgaps being lateral and encircling the peripheral surface of said rotor member adjacent said associated end,
   means formed of diamagnetic material affixed adjacent each end of said rotor member at said airgaps to coact with the associated permanent magnet,
   an electrical conductor affixed to the outermost peripheral surface of said rib portion of said rotor member, and
   an energizable stator winding disposed adjacent said electrical conductor.

2. The structure specified in claim 1 wherein said rib portion has a substantially T-shaped cross section to form a flattened outermost peripheral surface, and wherein said electrical conductor is a strip of electrically conductive material affixed to said flattened outermost peripheral surface and extending around said rotor member.

3. The structure specified in claim 1 further including,
   a shaft member connected to and extending longitudinally from each end of said rotor member,
   a pair of stationary housing members surrounding the extending end of each of said shaft members, and
   roller bearing means interposed between the extending end of each of said shaft members and the associated stationary housing member.

4. The device specified in claim 1 wherein each end of said rotor member is formed with a notch extending around the outermost end surface and the adjacent peripheral surface thereof, and wherein said diamagnetic means comprises a pair of annular inserts adapted to be inserted into said rotor notches.

5. The device specified in claim 1 wherein each end of said rotor member is in the form of an enlarged, substantially cup-shaped portion.

6. The device specified in claim 5 wherein each of said enlarged rotor end portions is formed with a notch extending around the outermost end surface and the adjacent peripheral surface thereof and wherein said diamagnetic means comprises a pair of annular inserts made of diamagnetic material and adapted to be inserted into the notch in each of said enlarged rotor end portions.

7. The device specified in claim 2 wherein each end of said rotor member is in the form of an enlarged, substantially cup-shaped portion, each of said enlarged rotor end portions being formed with a notch extending around the outermost end surface and the adjacent peripheral surface thereof, and wherein said diamagnetic means comprises a pair of annular inserts made of diamagnetic material and adapted to be inserted into the notch in each of said enlarged rotor end portions.